May 23, 1961 O. KNEISEL 2,985,770

PLURAL-STAGE IMPULSE TIMING CHAIN CIRCUIT

Filed Dec. 26, 1957 2 Sheets-Sheet 1

Inventor:
Otto Kneisel
By [signature] Atty.

Inventor:
Otto Kneisel
By [signature] Atty.

2,985,770
Patented May 23, 1961

2,985,770

PLURAL-STAGE IMPULSE TIMING CHAIN CIRCUIT

Otto Kneisel, Munich-Grosshesselohe, Germany, assignor to Siemens & Halske Aktiengesellschaft Berlin and Munich, a corporation of Germany Filed Dec. 26, 1957, Ser. No. 705,295

Claims priority, application Germany Jan. 29, 1957

6 Claims. (Cl. 307—88.5)

Figure 1:
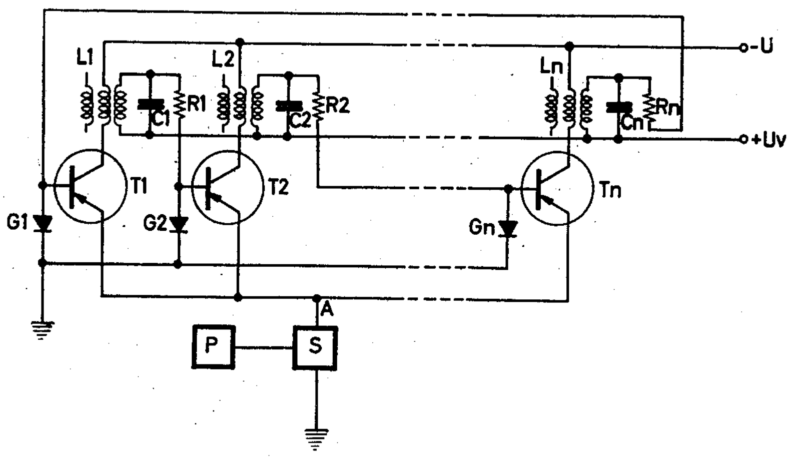

This invention is concerned with a plural-stage impulse timing chain circuit and may be considered as an improvement on the timing chain arrangement disclosed in copending application Serial No. 424,716, filed April 21, 1954, now Patent No. 2,912,576.

The object of the timing chain according to the copending application is to deliver output pulses which are mutually displaced as to time. For this purpose, pulses are fed to the input of the chain or impulses delivered at the output thereof are fed back to the chain input. Output pulses may be derived from the individual stages for use thereof as desired. The individual stages of the chain comprise amplifier elements which are normally blocked and additionally locked by the use of special switches, the stages being mutually coupled by way of resonance circuits. The latter are excited by impulses occurring at the outputs of the respectively preceding amplifier elements to produce oscillations which decay in suitable manner due to the action of damping resistors. The oscillations of the resonance circuits start in a phase position, such that the next successive amplifier element becomes conductive during the second half wave provided that it is unlocked by the switching means allotted thereto. The oscillation decays in such a manner that the fourth half wave which has the same polarity as the second half wave, has an amplitude so low, that it can not make the next successive amplifier element conductive. The switches are controlled by pulses the period duration of which corresponds sufficiently with the running time of an impulse between two stages, the phase position of the impulses being such that the unlocking or releasing interval falls within the time of the operative release of the amplifier elements under control of the corresponding second half waves.

The present invention provides a particularly advantageous improved timing chain of the above indicated kind. The advantages will appear from the explanations which will presently be rendered.

The circuit according to the invention provides a switch governed by the control pulse and connected between the poles of the operating voltage source, such switch being common to all stages, and means for connecting for each stage a resonance circuit in series with the emitter-collector path of a junction transistor, wherein the oscillating current produced by the resonance circuit flows, depending upon its direction, from the damping resistor of the respective resonance circuit alternately by way of the base-emitter path of the corresponding transistor and by way of a diode rectifier disposed between the base and the pole of the operating current source which feeds the emitter.

In accordance with another feature of the invention, the collector-emitter path of a junction transistor constitutes the pulse-controlled switch, the control pulse being suitably delivered by a pulse transmitter constructed of two junction transistors and being conducted to the base of the switch.

In accordance with a further feature of the invention, the second pole of the operating voltage source may at one or more stages be connected by way of the emitter-base path of a further transistor employed in the corresponding stage, such transistor being of a conductivity type opposite to that of the junction transistor employed in the corresponding stage as an amplifier element, such further transistor being connected so that amplified timing chain impulses may be obtained at the collector thereof.

Figure 2:
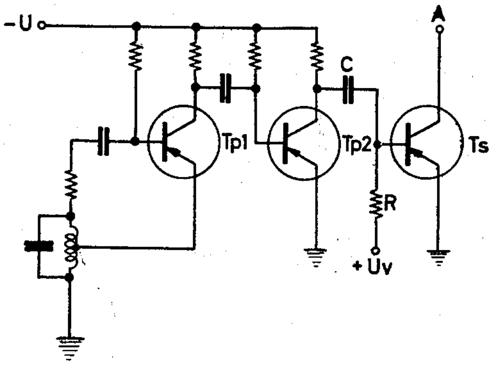
Figure 3A:
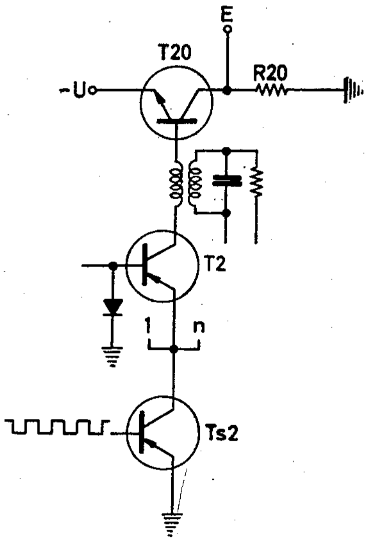
Figure 3B:
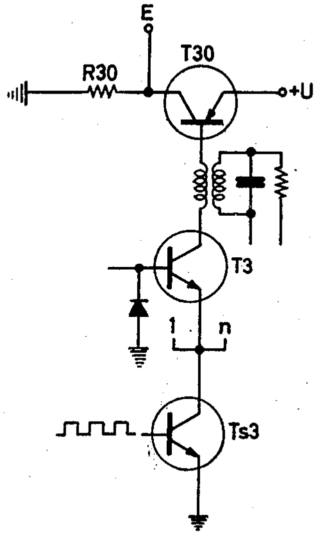
Figure 4:
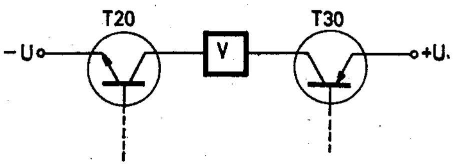

The various objects and features of the invention will appear from the description which will be rendered below with reference to the accompanying drawings. In the drawings, Fig. 1 shows an embodiment of a timing chain according to the invention, using p-n-p junction transistors;

Fig. 2 illustrates the switch employed in the chain and also an example of a pulse transmitter;

Figs. 3*a* and 3*b* represent each a stage in a chain, using an auxiliary output transistor for amplifying the impulses; and Fig. 4 shows the output transistors of two individual chains serially connected with a device for receiving impulses therefrom.

The embodiment of a timing chain illustrated in Fig. 1 comprises a desired plurality of amplifying stages of which only three stages are shown. The first stage comprises the p-n-p transistor T1, the resonance circuit coil L1, the oscillating circuit capacitor C1, the damping resistor R1 and the diode rectifier G1. Each of the remaining stages is constructed similarly. The emitters of the transistors are connected to ground by way of a common switch S. The transistor of a predetermined stage, for example, the transistor T2, is coupled with the coil L2 of the next successive resonance circuit by way of the coupling winding disposed between the terminal of the voltage —U and its collector, and is controlled by current from the damping resistor R1 of the preceding resonance circuit.

Each transistor is normally blocked by positive base bias potential +U*v* connected by way of the corresponding resonance circuit coil and the damping resistor, respectively. The voltage drop in pass direction at the rectifiers respectively connected between the bases and ground suffices for reliably securing the blocking. In addition, each transistor is blocked and unblocked by means of the switch S, in step with the pulses delivered by the pulse transmitter or generator P. Current can flow through a transistor only upon cessation of the positive bias and simultaneous closure of the switch S.

Now, when a negative impulse is connected or transmitted from the last stage of the chain, by way of the damping resistor R*n*, to the base of the transistor T1 of the first stage, as provided for in the present circuit, an injection current of defect electrons will flow from the emitter to the base, during the corresponding interval when the transistor is unblocked by the actuation of the switch S. The transistor is during this interval conductive, and a current impulse will flow from the switch over the emitter-collector path of transistor T1 and the coupling winding of coil L1, such current impulse initiating an oscillation in the resonance circuit comprising the coil L1 and the capacitor C1. Assuming, of course, that the coupling winding is wound in proper direction, the first half-wave of the oscillation will be positive. Current will accordingly flow from the damping resistor R1 over the diode rectifier G2 to ground. The next half-wave is negative and the corresponding current will make the transistor T2 conductive during the unblocking interval. The operation is similar as in case of the transistor T1.

It is thus possible, as previously stated, to make the impulse running time between two stages equal to the duration of the pulse delivered by the impulse generator P which controls the switch S. It will be seen, that both half-waves of the oscillation can flow off, one by way of the diode rectifier G2 and the other by way of the base-emitter path of the transistor T2. The resistor R1 operates during this interval as a damping resistor. There is, accordingly, a damped and therefore decaying oscillation present, and the next negative half-wave can not make the transistor conductive. The operation is repeated analogously with respect to the other stages of the timing chain.

Instead of obtaining from the last stage of the chain the impulses conducted to the first stage thereof, they may be obtained from other suitably selected stages or by way of a pulse frequency divider from the pulse transmitter P, in a manner as already described in the previously noted copending application. Various modes of operation disclosed in the copending application may likewise be effected by the present invention.

The example of the invention described above uses p-n-p transistors. However, a timing chain may be constructed by using n-p-n transistors requiring operating voltages of opposite polarity but functioning electrically in analogous manner. This may be advantageous when using two cooperating timing chains which may be constructed with different transistors.

Fig. 2 shows a particularly advantageous embodiment of the switch S used in conjunction with the timing chain. The switch comprises a transistor T*s* in emitter circuit, the emitter being connected with ground potential. The positive bias potential $+U_v$ is normally effective at the base. The transistor is, accordingly, normally not conductive and blocks the transistors T1 to T*n* of the chain. An impulse transmitter comprising transistors T*p*1 and T*p*2 delivers to the base of the transistor T*s* negative impulses by way of capacitor C, the transistor T*s* becoming conductive for the duration of the impulses and thereby unblocking the other transistors in the chain. The pulse transmitter as such is constructed in known manner. In the base-emitter circuit of the transistor T*p*1 there is connected a resonance circuit in delta fashion. The generated oscillations are shaped by the transistor T*p*2 operating as an amplitude limiter, and are conducted to the transistor T*s* as rectangular impulses.

The uncoupling of the pulses occurring at the individual stages of the chain may be effected in different manner. Several possibilities are for this purpose mentioned in the copending application, which may also be applied in case of the invention, for example, uncoupling by means of an uncoupling repeater inserted between collector and the resonance circuit coupling winding, or directly from the collector, by suitably inserting a resistor between the collector and the resonance circuit coupling winding.

The circuit shown in Fig 3*a* will be found very advantageous in deriving the impulses without feedback, Fig. 3*a* representing only one stage of a timing chain. Between the end of the coupling winding of the resonance circuit and the corresponding pole of the operating voltage source is inserted the base-emitter path of a further transistor T20 of conductivity type opposite to that of the junction transistor T2 employed as an amplifier element, the collector of said further transistor being connected with the other pole of the voltage source over a resistor R20. The impulses may be obtained or derived at the terminal E which may be connected with the device utilizing such impulses, or by conducting the current flowing through the resistor R20 directly through such device. When the transistor T2 is made conductive, its collector current will flow along the base-emitter path of the transistor T20, thereby delivering an amplified impulse.

Fig. 3*b* shows a corresponding stage of a chain having transistors of respectively opposite conductivity type, operating just like the one shown in Fig. 3*a*, but having the operating voltage source connected with opposite polarity.

Upon connecting the emitters of the respective transistors T*s*2 and T*s*3, each functioning as a switch, uniformly to ground in two individual chains, the collectors of the transistors T20 and T30, used for the uncoupling, will both operate over a resistance to ground. This makes it possible to connect a device V, requiring the impulses, between the collectors, as shown in Fig. 4. These collectors will then function as outputs of two individual chains. Current can flow through the device V only at times when both transistors T20 and T30 are simultaneously conductive. The device V will accordingly receive an impulse only under such condition. The circuit operates in the manner of a coincidence circuit, needed in case of certain uses of timing chains, without requiring auxiliary switching elements.

The use of junction transistors presents in addition to known advantages such as absence of cathode heating, low heat development, small space requirements, low operating voltage, further particular advantages, namely, elimination of rectifiers such as are employed in a circuit disclosed in the previously noted copending application. The possibility of using further transistors of conductivity type opposite to that of the transistors functioning as amplifier elements, as disclosed herein in connection with timing chains permits connection, in simple manner, of an output transistor at any desired stage of the chain so as to effect the uncoupling of impulses from the corresponding stage. The invention is particularly advantageous in cases requiring impulses of some magnitude. Moreover, the timing chains may be constructed in different manner by means of respectively opposite conduction type transistors, resulting in the possibility to provide uncoupling transistors of opposite conduction type, acting upon a common device requiring the impulses, without necessitating auxiliary switching elements, while producing the effect of a coincidence circuit. The control electrodes of these uncoupling transistors, that is, their bases, are on a potential which is close to that of the corresponding pole of the operating voltage source, such potential determining inter alia, the operating condition of the corresponding transistor. The voltage between base and emitter of one uncoupling transistor is independent of the operating condition of the respective other transistor, since there always is at the emitter a fixed potential, namely, one of the potentials of the working voltage source. A disturbing mutual influence of these transistors accordingly can not occur. On the other hand, if two similar serially connected uncoupling transistors would cooperate, the emitter of one of these transistors could not be connected to a fixed potential.

Changes may be made within the scope and spirit of the appended claims.

I claim:

1. An impulse timing chain circuit having a voltage source, a plurality of serially related stages each comprising a junction transistor operating as an amplifier element and having a resonance circuit cooperatively associated therewith which is adapted to produce oscillations and a damping resistor cooperatively related to said resonance circuit, said damping resistor forming means for operatively coupling the corresponding transistor, and having means for supplying control impulses to effect operative actuation of the respective transistor and means for each stage for inductively uncoupling output impulses therefrom; a switching device common to said stages and governed by said control impulses, means for connecting said switching device between the poles of said voltage source in circuit with the emitter-collector paths of the respective junction transistors and in series with the corresponding resonance circuit of the respective stages, a diode rectifier for each stage disposed between the base of the corresponding transistor and the pole of said voltage source which feeds the emitter thereof, the oscillating current produced by the respective resonance circuit flowing depending upon its direction from the damping resistor cooperatively related thereto over the base-emitter path of the corresponding transistor or over said diode rectifier.

2. A structure and cooperation of parts according to claim 1, wherein the collector-emitter path of another junction transistor constitutes said switching device, and means for conducting control impulses to the base of such other junction transistor.

3. A structure and cooperation of parts according to claim 2, comprising an impulse transmitter constituting the means for supplying said control impulses, said impulse transmitter comprising two cooperatively connected junction transistors.

4. A structure and cooperation of parts according to claim 1, comprising a further transistor for at least one of said stages which is of a conductivity type opposite to that of the junction transistor which constitutes the amplifying element of the corresponding stage, means for connecting the emitter-base path of said further transistor between one pole of said voltage source and the emitter of the junction transistor of the corresponding stage, and means for deriving amplified timing pulses from the collector of said further transistor.

5. A structure and cooperation of parts according to claim 2, comprising a further transistor for at least one of said stages which is of a conductivity type opposite to that of the junction transistor which constitutes the amplifying element of the corresponding stage, means for connecting the emitter-base path of said further transistor between one pole of said voltage source and the emitter of the junction transistor of the corresponding stage, and means for deriving amplified timing pulses from the collector of said further transistor.

6. A structure and cooperation of parts according to claim 3, comprising a further transistor for at least one of said stages which is of a conductivity type opposite to that of the junction transistor which constitutes the amplifying element of the corresponding stage, means for connecting the emitter-base path of said further transistor between one pole of said voltage source and the emitter of the junction transistor of the corresponding stage, and means for deriving amplified timing pulses from the collector of said further transistor.

References Cited in the file of this patent

UNITED STATES PATENTS

| | | |
|---|---|---|
| 2,594,336 | Mohr | Apr. 29, 1952 |
| 2,831,126 | Linville et al. | Apr. 15, 1958 |
| 2,838,664 | Wolfendale | June 10, 1958 |
| 2,846,594 | Pankratz et al. | Aug. 5, 1958 |
| 2,848,628 | Altschul | Aug. 19, 1958 |
| 2,860,261 | Verkuissen | Nov. 11, 1958 |